United States Patent [19]
Isahaya

[11] 3,885,918
[45] May 27, 1975

[54] EXHAUST GAS CLEANING APPARATUS

[75] Inventor: Fumio Isahaya, Hitachi, Japan

[73] Assignee: Hitachi, Ltd., Japan

[22] Filed: Sept. 1, 1972

[21] Appl. No.: 285,644

[30] Foreign Application Priority Data
Sept. 10, 1971 Japan.............................. 46-69675

[52] U.S. Cl. ...................... 23/284; 23/285; 55/257; 239/405; 239/431; 423/242
[51] Int. Cl. ... B01d 47/06; B05b 7/00; C01b 17/62
[58] Field of Search ................. 23/284, 285, 288 F; 55/257; 261/88, 118; 239/403, 405, 430, 431; 423/232, 234, 242

[56] References Cited
UNITED STATES PATENTS
3,110,444  11/1963  Eakins ........................... 239/431 X
3,172,736  3/1965  Gee et al. .............................. 23/285
3,385,030  5/1968  Letvin................................... 55/257

Primary Examiner—Joseph Scovronek
Assistant Examiner—Michael S. Marcus
Attorney, Agent, or Firm—Craig & Antonelli

[57] ABSTRACT

In an exhaust gas cleaning apparatus comprising a tower of substantial volume, means for introducing exhaust gas including acid material to be removed into said tower, means for introducing liquid including alkali material into said tower so that the alkali material reacts with said acid material to produce solid particles, and means for removing the solid particles from the exhaust gas, spray means is provided for spraying liquid in such a manner that the atomized particles of said liquid are moved in said tower without interfering with each other.

18 Claims, 4 Drawing Figures

EXHAUST GAS CLEANING APPARATUS

BACKGROUND OF THE INVENTION

The present invention relates to an apparatus for removing from exhaust gas an air polluting material, particularly an acid material. More particularly, the present invention relates to an apparatus in which liquid containing alkali material is sprayed in a form of fine particles into exhaust gas containing acid material so that the materials react with each other to produce solid particles which are thereafter separated from the exhaust gas.

In order to remove nitrogen oxide, sulphur oxide, fluorine gas, chlorine gas and/or hydrogen chloride in an exhaust gas, various methods and apparatus have been developed. For example, there has been proposed to introduce exhaust gas into an reaction tower in which liquid containing alkali material such as sodium hydroxide, sodium carbonate or the like in a spray form so that it reacts with acid material in the exhaust gas, the reaction products being thereafter separated from the gas. This method is called as semi-wet type gas cleaning process.

In this semi-wet type method, the reaction products are usually dried into solid particles which are thereafter separated from the exhaust gas by means of a suitable separator such as a cyclone. In order to increase the efficiency of separation in the separator, the exhaust gas cleaning apparatus must be so designed that solid particles of suitable particle size can be obtained in the apparatus. If the particle size of solids is too small, the efficiency of separation is decreased. The efficiency of separation increases as the particle size increases, however, if the particle size is excessively large, reduced area of contact between the exhaust gas and the liquid will cause a decrease in reaction rate. In order to have the reaction products completely dried by the heat of the exhaust gas during the movement of the products in the reaction tower, the size of liquid particles sprayed into the exhaust gas in the tower must not be excessively large. Thus, according to the known method, the size of liquid particles or sprayed mist must be within a predetermined range in order to control the particle size of reaction products.

SUMMARY OF THE INVENTION

An object of the present invention is to provide an exhaust gas cleaning apparatus including a reaction tower in which exhaust gas can be efficiently brought into contact with sprayed particles of alkali-containing liquid.

Another object of the present invention is to provide an exhaust gas cleaning apparatus which can produce reaction products in a form of solid particles having particle size of a predetermined range, so that the solid particles can be efficiently separated.

A further object of the present invention is to provide an exhaust gas cleaning apparatus in which size of sprayed mist is controlled within a predetermined range, so that the reaction products can be efficiently dried and solid particles thus dried can be readily separated and collected.

According to the present invention, there is provided an exhaust gas cleaning apparatus comprising a reaction tower of a substantial volume, means for introducing exhaust gas into the reaction tower, means for spraying liquid containing alkali material into the exhaust gas in such a manner that the sprayed mist is substantially free from mutual interference and does not collide with the wall of the reaction tower, so that the alkali material reacts with acid material contained in the exhaust gas to produce particles of reaction products which are dried in the reaction tower during their movement therein, and separating means for separating the dried particles.

These and other objects and features of the present invention will become apparent from the following descriptions of a preferred embodiment taking reference to the accompanying drawings.

DESCRIPTION OF THE PREFERRED EMBODIMENT

The present invention is intended to employ a spraying device in which exhaust gas is introduced downwardly into a reaction tower and alkali-containing liquid is sprayed substantially along the exhaust gas flow but with an inclination to the gas flow so that the spray intersects the gas flow, whereby acid material in the exhaust gas is brought into reaction with the alkali material. The spray device may be of such a type in which the alkali-containing liquid is propelled by a suitable medium such as compressed air. This type of spray device will be called hereinafter as a two-fluid nozzle.

Figure 1:
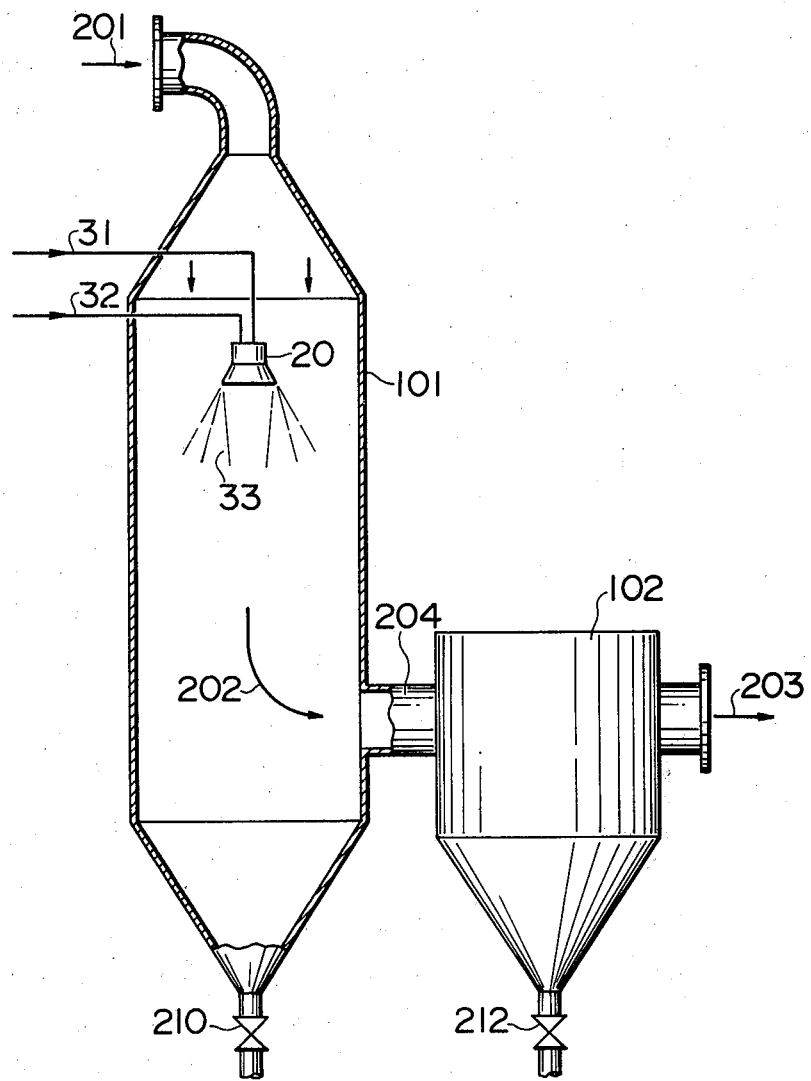
FIG. 1 is a diagrammatical sectional view of an exhaust gas cleaning apparatus in accordance with the present invention.
Figure 2:
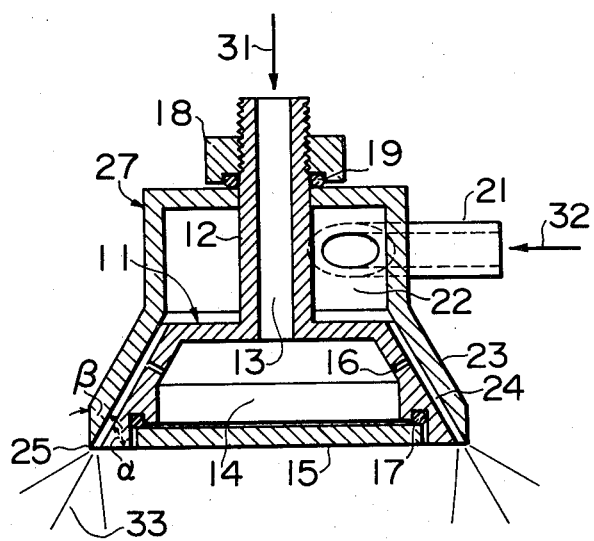
FIG. 2 is a fragmentary sectional view showing an alkali-containing liquid spraying means used in the apparatus of the present invention.
Figure 3:
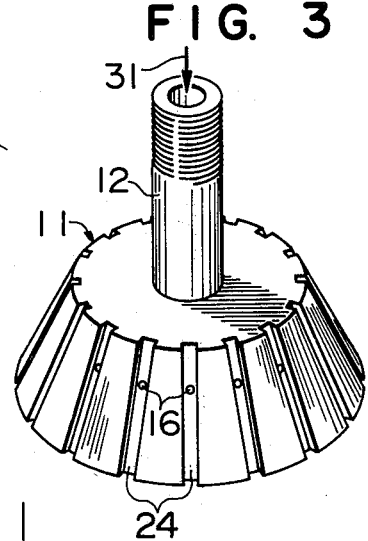
FIG. 3 is a perspective view showing the inner casing of the spraying means shown in FIG. 2; and, FIG. 4 is a diagram showing the relationship among the particle size of alkali-containing liquid, the drying time of the reaction products and the rate of oxidization of $Na_2SO_3$.
Figure 4:
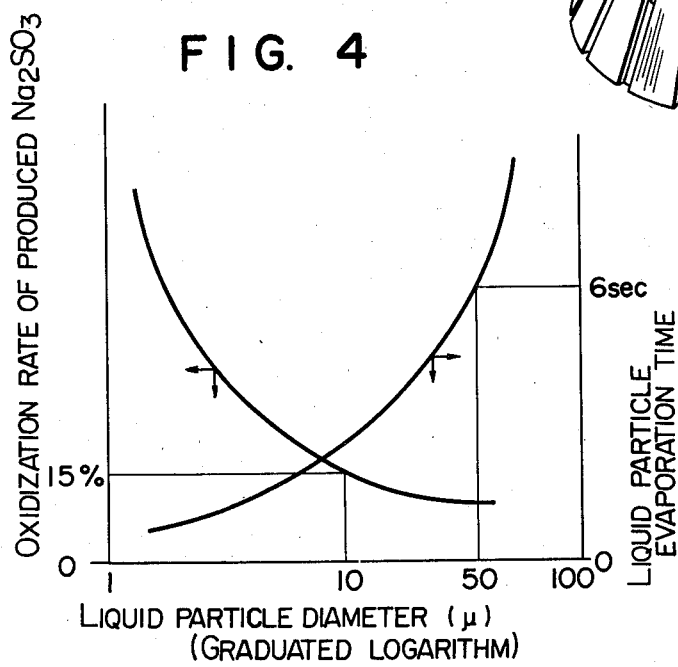

Referring to FIG. 1, the reference numeral 101 designates a reaction tower, and 102 an after dust collector which is connected to the reaction tower 101 through a smoke tunnel 204. The numeral 201 designates an exhaust gas inlet, 202 the direction of flow in the reaction tower, 203 a cleaned gas outlet, and 20 a two-fluid type nozzle disposed at the substantially center portion of the top of the reaction tower 101. With this arrangement, it is possible to spray alkali liquid at a position where the exhaust gas temperature is the highest, so as to minimize liquid particles adhering to the wall of the tower. The nozzle 20 is supplied with spray liquid 31 and compressed gas 32 which are sprayed into the reaction tower as a spray mist.

The reaction tower 101 and the after dust collector 102 are respectively provided with dust outlet valves 210 and 212 at their lower portions.

In operation, an exhaust gas such as boiler waste gas containing $SO_2$ gas is introduced into the reaction tower 101 through the gas inlet 201 and alkali solution is sprayed radially from the two-fluid type nozzle 20 so that the spray intersects with the gas flow.

The spray nozzle 20 is supplied with alkali solution 31 such as NaOH and atomizing compressed gas 32 such as air. The $SO_2$ content in the exhaust gas is removed from the gas by being absorbed by the sprayed alkali mist 33 and the liquid content in the mist is evap- 1. An exhaust gas cleaning apparatus comprising:
   a. an inlet for directing an exhaust gas containing acid material from a source of combustion;
   b. a reaction tower connected substantially at the top end with said inlet and at the other end with an exhaust gas outlet;
   c. a separator having one end connected to said exhaust gas outlet and the other end with an outlet port; and
   d. a two-fluid spraying device provided in said reaction tower for spraying, in the form of fine liquid particles, a liquid containing alkali material which can react with said acid material, said spraying device being provided with a port for introducing compressed gas which is adapted to spray the liquid under pressure, said spraying device further having diverging spraying passages disposed on a diverging conical surface, said passages being provided with separate inlets for said liquid alkali material and for said gas.

2. An apparatus in accordance with claim 1 in which the passages in said spraying device are shaped and sized so that the particle size of alkali solution sprayed therefrom is between $10\mu$ and $50\mu$.

3. An apparatus in accordance with claim 1 in which said spraying device comprises an inner casing including a passage for the alkali solution, a liquid chamber connected to the passage, a plurality of liquid outlet ports extending radially outwardly from the liquid chamber and a plurality of spraying passages communicating with said outlet ports at the outer periphery of the liquid chamber and extending along a diverging conical surface; and an outer casing encircling said inner casing and comprising a compressed gas inlet pipe and a skirt adapted to be in close contact with the portion of the inner casing where said spraying passages are formed, said outer casing defining an air chamber with said inner casing when they are assembled.

4. An apparatus in accordance with claim 1, wherein said spraying passages are arranged at an angle of from about 45° to 60° with respect to the plane normal to the longitudinal centerline of said reaction tower.

5. An apparatus in accordance with claim 4, wherein the cross-sectional size of said spraying passages is so selected that the particle size of the alkali solution sprayed therefrom is between $10\mu$ and $50\mu$.

6. An apparatus in accordance with claim 1, wherein said spraying means comprises an inner casing and an outer casing, said inner and outer casings defining therebetween said plurality of spraying passages.

7. An apparatus in accordance with claim 6, wherein said spraying means defines a liquid inlet passage for the alkali solution, a liquid chamber connected to said liquid inlet passage, a plurality of liquid outlet ports extending between said liquid chamber and respective spraying passages, an air chamber common to each of said spraying passages, and air inlet means in communication with said air chamber.

8. An apparatus in accordance with claim 7, wherein said air inlet means is arranged substantially tangentially to said air chamber.

9. An apparatus in accordance with claim 1, wherein each of said spraying passages is arranged on a generatrix of said conical surface.

10. An apparatus in accordance with claim 9, wherein said spraying passages are arranged at an angle of from about 45° to 60° with respect to the plane normal to the longitudinal centerline of said reaction tower.

11. An apparatus in accordance with claim 10, wherein the cross-sectional size of said spraying passages is so selected that the particle size of the alkali solution sprayed therefrom is between $10\mu$ and $50\mu$.

12. An exhaust gas cleaning apparatus comprising: a reaction tower provided at one end with means for introducing an exhaust gas containing acid material from a source of combustion; a separator connected to another end of said reaction tower; and a spraying device having a plurality of passages for spraying into said reaction tower a liquid containing alkali material which can react with said acid material in the form of fine liquid particles, said passages of said spraying device being provided with an inlet for the liquid containing alkali material and with an inlet for an atomizing gas which aids the spraying of said liquid into said reaction tower and with an outlet for spraying said liquid and said atomizing gas directly into said reaction tower at an angle of 30° to 45° with respect to the axis of said reaction tower, said passages arranged so that fine liquid particles sprayed therefrom diverge in said reaction tower.

13. An exhaust gas cleaning apparatus according to claim 12, wherein the passages in said spraying device are arranged such that said liquid particles are sprayed in the form of a cone diverging in the direction of the exhaust gas flow.

14. An exhaust gas cleaning apparatus according to claim 12, wherein said spraying device is disposed in said reaction tower near said means for introducing exhaust gas.

15. An exhaust gas cleaning apparatus according to claim 12, in which the divergence of said liquid particles is in the direction of the exhaust gas flow at an angle of 30° to 45° with respect to the axis of said reaction tower.

16. An exhaust gas cleaning apparatus according to claim 15, wherein the passages in said spraying device are arranged such that said liquid particles are sprayed in the form of a cone diverging in the direction of the exhaust gas flow.

17. An exhaust gas cleaning apparatus according to claim 15, wherein said spraying device is disposed in said reaction tower near said means for introducing exhaust gas.

18. An exhaust gas cleaning apparatus according to claim 15, wherein said spraying device comprises: an inner casing including a liquid supply passage for supplying the liquid containing alkali material, a liquid chamber communicated with said liquid supply passage, a plurality of grooves formed in the outer periphery of said liquid chamber, and a plurality of ports communicating between said liquid chamber and respective grooves; and an outer casing encircling said inner casing, said inner and outer casings defining an air chamber communicated with a gas inlet for the atomizing gas when assembled with said inner casing, said outer casing including a skirt which is in close contact with the portion of said inner casing where said grooves are formed thereby defining the passages for the liquid containing alkali material and the atomizing gas.

* * * * *